United States Patent
Sohn et al.

(10) Patent No.: US 11,945,276 B2
(45) Date of Patent: Apr. 2, 2024

(54) PREVIEW VEHICLE HEIGHT CONTROL SYSTEM AND METHOD OF CONTROLLING THE SAME

(71) Applicants: Hyundai Motor Company, Seoul (KR); Kia Corporation, Seoul (KR); Foundation for Research and Business, Seoul National University of Science and Technology, Seoul (KR)

(72) Inventors: Youngil Sohn, Yongin-si (KR); Min Jun Kim, Busan (KR); Sang Woo Hwang, Seoul (KR); Sehyun Chang, Suwon-si (KR); Jun Ho Seong, Seoul (KR); Yong Hwan Jeong, Seoul (KR); Seong Jin Yim, Seoul (KR)

(73) Assignees: HYUNDAI MOTOR COMPANY, Seoul (KR); KIA CORPORATION, Seoul (KR); FOUNDATION FOR RESEARCH AND BUSINESS SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 105 days.

(21) Appl. No.: 17/891,552

(22) Filed: Aug. 19, 2022

(65) Prior Publication Data
US 2023/0331057 A1     Oct. 19, 2023

(30) Foreign Application Priority Data
Apr. 13, 2022 (KR) .................. 10-2022-0045907

(51) Int. Cl.
*B60G 17/0165* (2006.01)
*B60G 17/018* (2006.01)
*B60G 17/019* (2006.01)

(52) U.S. Cl.
CPC ..... *B60G 17/0165* (2013.01); *B60G 17/0182* (2013.01); *B60G 17/019* (2013.01);
(Continued)

(58) Field of Classification Search
CPC ........... B60G 17/0165; B60G 17/0182; B60G 17/019; B60G 2400/204; B60G 2400/252;
(Continued)

(56) References Cited

U.S. PATENT DOCUMENTS

2020/0215867 A1* 7/2020 Park ................. B60G 17/019
2021/0245568 A1* 8/2021 Kawata ............ B60G 17/005
(Continued)

FOREIGN PATENT DOCUMENTS

KR    10-1992-0000519 A    1/1992
KR    10-2020-0145884 A    12/2020

OTHER PUBLICATIONS

Yonghwan Jeong, et al. (2022). Design of Virtual Reference Feedforward Controller for an Active Suspension System. IEEE Access. 10: 65671-65684.

*Primary Examiner* — George C Jin
(74) *Attorney, Agent, or Firm* — Morgan, Lewis & Bockius LLP

(57) ABSTRACT

The present disclosure discloses a preview vehicle height control system and a method of controlling the same. The system includes a monitoring device configured to detect the road surface condition of a driving path of a vehicle, an active suspension configured to adjust a vehicle height, a memory configured to store a plurality of data maps distinguished based on a type of bump, each data map having a vehicle dynamic characteristic as an input and a tuning factor as an output, and a controller configured to derive the tuning factor based on a data map, among the plurality of data maps of the memory, corresponding to the bump (Continued)

detected by the monitoring device, derive a target vehicle height in a form of a Gaussian distribution by substituting the tuning factor, and control the active suspension to follow the derived target vehicle height.

14 Claims, 4 Drawing Sheets

(52) U.S. Cl.
CPC .. *B60G 2400/204* (2013.01); *B60G 2400/252* (2013.01); *B60G 2401/14* (2013.01); *B60G 2600/182* (2013.01); *B60G 2600/70* (2013.01); *B60G 2800/70* (2013.01); *B60G 2800/914* (2013.01)

(58) Field of Classification Search
CPC .......... B60G 2401/14; B60G 2600/182; B60G 2600/701; B60G 2800/70; B60G 2800/914
See application file for complete search history.

(56) References Cited

U.S. PATENT DOCUMENTS

| | | | |
|---|---|---|---|
| 2022/0105773 A1* | 4/2022 | Kim | B60G 17/06 |
| 2023/0135234 A1* | 5/2023 | Wang | G06V 10/82 |
| | | | 382/103 |
| 2023/0331057 A1* | 10/2023 | Sohn | B60G 17/0165 |
| 2023/0398978 A1* | 12/2023 | Lewandowski | B60W 10/20 |

* cited by examiner

PREVIEW VEHICLE HEIGHT CONTROL SYSTEM AND METHOD OF CONTROLLING THE SAME

CROSS-REFERENCE TO RELATED APPLICATION

This application claims the priority benefit of Korean Patent Application No. 10-2022-0045907, filed on Apr. 13, 2022, in the Korean Intellectual Property Office, the disclosure of which is incorporated herein by reference.

BACKGROUND

The present disclosure relates to a preview vehicle height control system and a method of controlling the same capable of obtaining accurate information on a bump on a road surface through a relatively small amount of calculation, identifying the type of bump, and controlling a vehicle height to follow a Gaussian distribution according to the type of identified bump, thereby achieving fast responsiveness and optimal ride comfort and driving stability.

BACKGROUND

For a luxury vehicle equipped with multiple functions, a preview electronic control suspension system is currently being employed. This system is configured to obtain information on the profile of a road surface from a front camera and use the information to control ride comfort to suppress changes in the orientation of the vehicle and improve ride comfort. However, since the system is controlled with a suspension using a semi-active variable damper, it is impossible to control the vehicle height.

In addition, such information on the profile of a road surface may be obtained from a camera installed for forward autonomous driving. Because active vehicle height control may be performed when active suspension is applied, it is possible to further optimize ride comfort. To this end, a target vehicle height profile for optimal vehicle height control needs to be calculated based on the profile of the current road surface.

Conventionally, in order to obtain a road surface profile or a vehicle height profile, the shape of the bump needs to be analyzed from an image and calculated. However, it is difficult to respond quickly due to the large amount of computation involved, and thus there are problems such as failure to correctly recognize a bump or ignoring a bump.

For this reason, the characteristics of the bump need to be identified more quickly, and technology to quickly control the suspension in response to the bump by deriving a target vehicle height even after detection of the bump is needed.

The information disclosed in this Background section is only for enhancement of understanding of the general background of the disclosure, and should not be taken as an acknowledgement or any form of suggestion that this information forms the related art already known to a person skilled in the art.

SUMMARY OF THE DISCLOSURE

Therefore, the present disclosure has been made in view of the above problems, and it is an object of the present disclosure to provide a preview vehicle height control system and a method of controlling the same capable of obtaining accurate information on a bump on a road surface through a relatively small amount of calculation, identifying the type of bump, and controlling a vehicle height to follow a Gaussian distribution according to the type of identified bump, thereby achieving fast responsiveness and optimal ride comfort and driving stability.

In accordance with an aspect of the present disclosure, the above and other objects can be accomplished by the provision of a preview vehicle height control system, the system including a monitoring device configured to detect the road surface condition of a driving path of a vehicle, an active suspension configured to adjust a vehicle height, a memory configured to store a plurality of data maps distinguished based on a type of bump, each data map having a vehicle dynamic characteristic as an input and a tuning factor as an output, and a controller configured to derive the tuning factor based on a data map, among the plurality of data maps of the memory, corresponding to the bump detected by the monitoring device, derive a target vehicle height in the form of a Gaussian distribution by substituting the tuning factor, and control the active suspension to follow the derived target vehicle height.

The monitoring device may include a camera sensor configured to capture the front or rear driving path of the vehicle.

The controller may receive a driving path image in the driving direction of the vehicle through the monitoring device, analyze the driving path image so as to detect the bump on the driving path, and identify the type of bump.

The controller may identify the type of the detected bump, call a data map related to the identified type of bump from the plurality of data maps in the memory, and derive a tuning factor by inputting the vehicle dynamic characteristic into the called data map.

The vehicle dynamic characteristic may include at least one of a speed, acceleration, weight, and center of gravity of the vehicle.

The tuning factor may include h and σ of the Gaussian distribution equation below.

$$z_{s,ref}(x) = \frac{h}{\sigma\sqrt{2\pi}} \exp\left(-\frac{1}{2}\left(\frac{x-\mu}{\sigma}\right)^2\right)$$

Herein, $z_{s,ref}(x)$ is the target vehicle height, x is a location of the vehicle, μ is an average, and h and σ are tuning factors.

The tuning factor may include $k_{prev}$ of the active suspension control force equation below.

$$u_{prev} = -k_{prev}(z_{s,ref} - z_s)$$

Herein, $u_{prev}$ is a target control force of the active suspension, $z_{s,ref}$ is the target vehicle height, $z_s$ is a current vehicle height value, and $k_{prev}$ is a tuning factor.

The controller may derive the target vehicle height in the form of the Gaussian distribution along a distance axis, and convert the Gaussian distribution along the distance axis into a Gaussian distribution along a time axis.

The controller may derive the target vehicle height based on the Gaussian distribution along the time axis and control the active suspension so that a current vehicle height follows the target vehicle height.

In accordance with another aspect of the present disclosure, there is provided a method of controlling a preview vehicle height control system, the method including detecting, by a monitoring device, a road surface condition of a driving path of a vehicle, detecting, by a controller, a bump on the driving path of the vehicle based on information from the monitoring device and identifying a type of the bump, calling a data map corresponding to the type of the bump identified by the controller from a memory, deriving a tuning factor by inputting a vehicle dynamic characteristic into the data map called by the controller, deriving, by the controller, a target vehicle height in a form of a Gaussian distribution by substituting the tuning factor, and controlling, by the controller, an active suspension to follow the derived target vehicle height.

Deriving the target vehicle height in the form of the Gaussian distribution may include substituting h and σ as tuning factors into the Gaussian distribution equation below.

$$z_{s,ref}(x) = \frac{h}{\sigma\sqrt{2\pi}} \exp\left(-\frac{1}{2}\left(\frac{x-\mu}{\sigma}\right)^2\right)$$

Herein, $z_{s,ref}(x)$ is the target vehicle height, x is the location of the vehicle, μ is an average, and h and σ are tuning factors.

The controlling an active suspension may include deriving the target control force of the active suspension by substituting $k_{prev}$ as the tuning factor into the active suspension control force equation below.

$$u_{prev} = -k_{prev}(z_{s,ref} - z_s)$$

Herein, $u_{prev}$ is the target control force of the active suspension, $z_{s,ref}$ is the target vehicle height, $z_s$ is a current vehicle height, and $k_{prev}$ is the tuning factor.

Deriving the target vehicle height in the form of the Gaussian distribution may include deriving, by the controller, the target vehicle height in the form of a Gaussian distribution along a distance axis and converting the Gaussian distribution along the distance axis into a Gaussian distribution along a time axis.

Deriving the target vehicle height in the form of the Gaussian distribution may include deriving, by the controller, the target vehicle height using the Gaussian distribution along the time axis.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION

Figure 1:
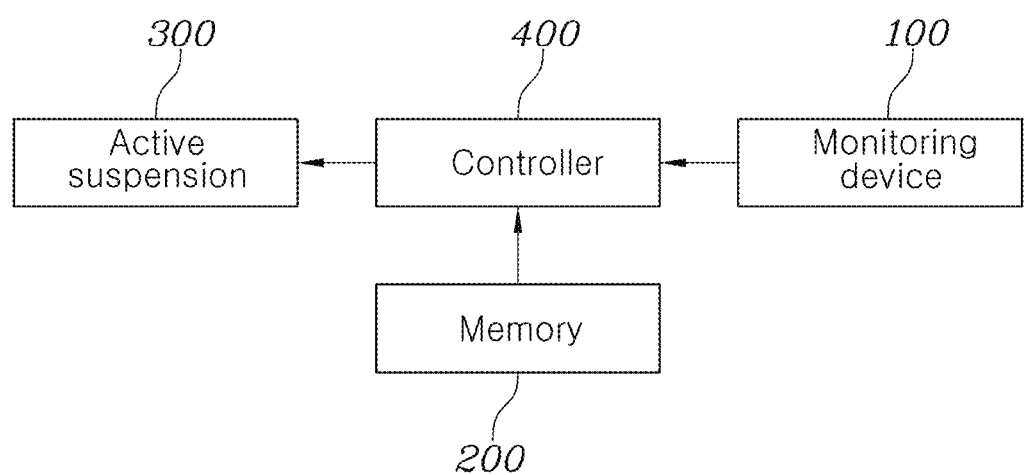
FIG. 1 is a block diagram of a preview vehicle height control system according to an embodiment of the present disclosure.
Figure 2:
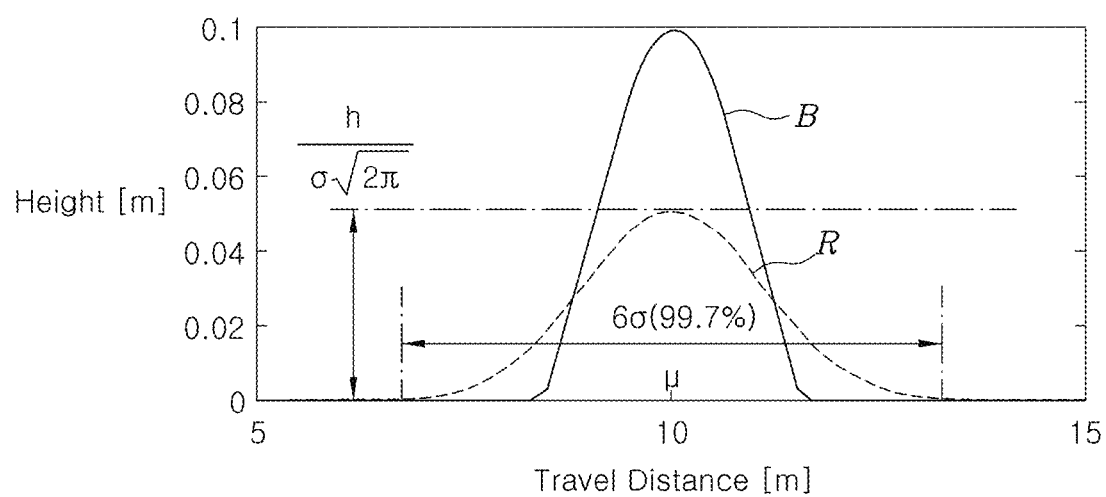
FIG. 2 is a graph of a Gaussian distribution of a preview vehicle height control system and a method of controlling the same according to an embodiment of the present disclosure.
Figure 3:
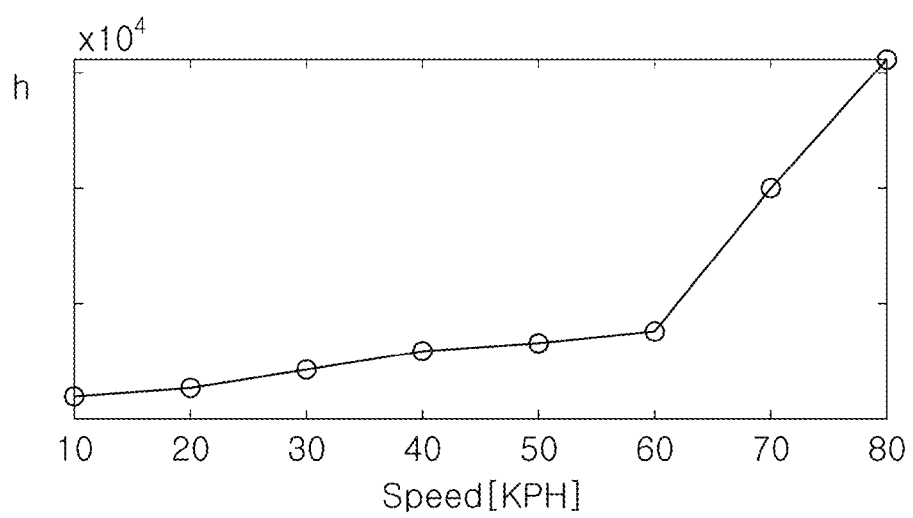
FIG. 3 is a graph related to a tuning factor of a preview vehicle height control system and a method of controlling the same according to an embodiment of the present disclosure.
Figure 4:
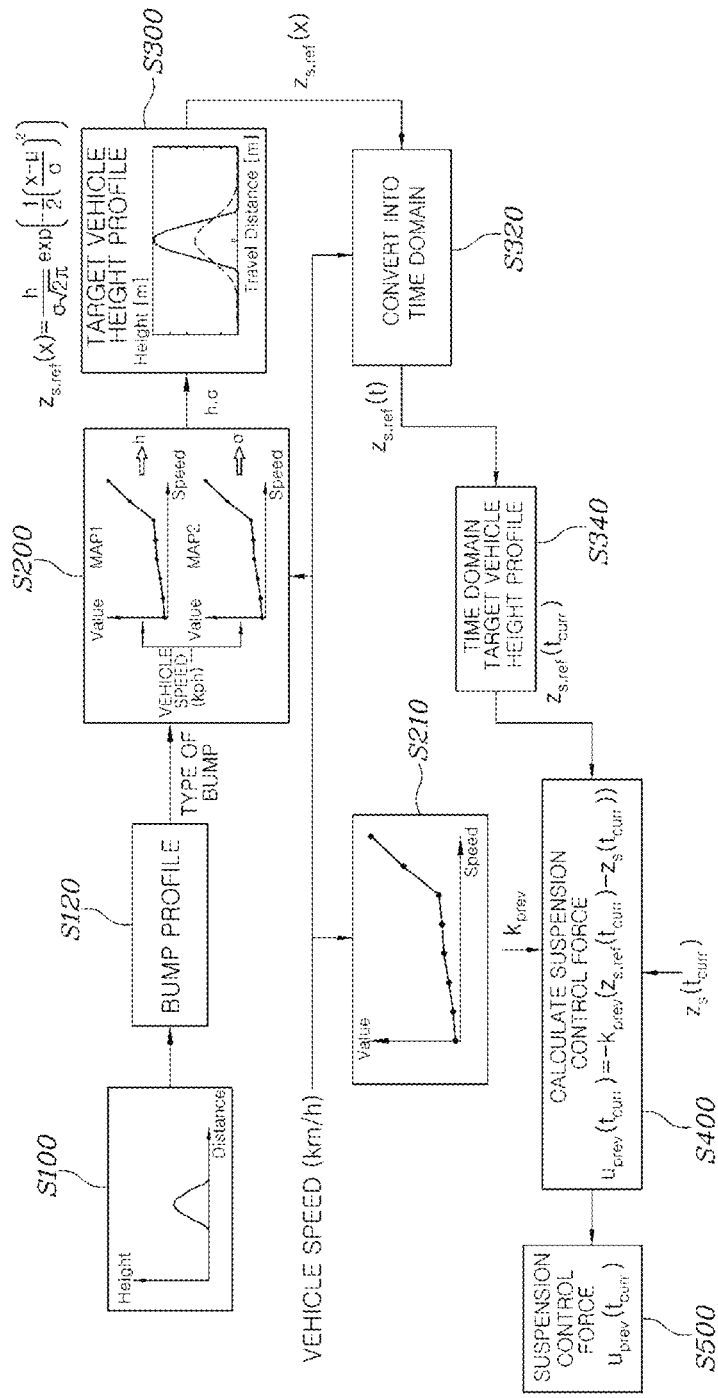
FIG. 4 is a chart showing a sequence of a method of controlling a preview vehicle height control system according to an embodiment of the present disclosure.

FIG. 1 is a block diagram of a preview vehicle height control system according to an embodiment of the present disclosure, FIG. 2 is a graph of a Gaussian distribution of a preview vehicle height control system and a method of controlling the same according to an embodiment of the present disclosure, FIG. 3 is a graph related to a tuning factor of a preview vehicle height control system and a method of controlling the same according to an embodiment of the present disclosure, and FIG. 4 is a chart showing a sequence of a method of controlling a preview vehicle height control system according to an embodiment of the present disclosure.

FIG. 1 is a block diagram of a preview vehicle height control system according to an embodiment of the present disclosure. The preview vehicle height control system according to an embodiment of the present disclosure includes a monitoring device 100 configured to detect a road surface condition of a driving path of a vehicle, an active suspension 300 configured to adjust a vehicle height, a memory 200 configured to store a plurality of data maps distinguished based on a type of bump, each data map having a vehicle dynamic characteristic as an input and a tuning factor as an output, and a controller 400 configured to derive the tuning factor using the data map of the memory corresponding to the bump detected using the monitoring device, derive a target vehicle height in the form of a Gaussian distribution by substituting the tuning factor, and control the active suspension to follow the derived target vehicle height.

The present disclosure utilizes the active suspension 300 capable of adjusting the vehicle height so that a passenger may feel ride comfort by suppressing changes in the vehicle height when the vehicle goes over a bump. When the vehicle goes over a bump on the road surface, it is important to identify the shape of the bump in advance in order to instantaneously adjust the vehicle height in real time. For this reason, it is necessary to generate a target vehicle height profile in advance according to the shape of the bump, or to control the vehicle height to follow the target value in real time immediately before going over the bump.

In the present disclosure, in identifying the shape of the bump, instead of deriving the shape of the bump by analyzing all of the images or data on the front in real time, the shape of a detected bump is matched and selected from a profile including various shapes of bump provided in advance, so the shape of the bump may be quickly read.

In addition, in the present disclosure, the actual vehicle height follows the target vehicle height, which is to be implemented while passing over the identified bump, so that a passenger may feel comfortable riding in the vehicle without feeling discomfort, and the steering stability of the vehicle may be optimized.

In particular, in many cases, a bump has a structure that is symmetrical front to rear due to the shape characteristics of the bump, and the most comfortable ride and steering stability can be realized when the vehicle height is adjusted in a front-rear symmetrical manner due to the characteristics of the vehicle's suspension. Therefore, the target vehicle height profile follows the Gaussian distribution, which has a front-rear symmetrical shape. Accordingly, smooth, comfortable, and predictable vehicle movement may be realized before, during, and after passing over a bump, so that the passenger does not feel discomfort, and moreover, the behavior of the vehicle is stabilized.

Specifically, as shown in FIG. 1, the preview vehicle height control system of the present disclosure is broadly divided into a monitoring device 100, a memory 200, a controller 400, and an active suspension 300. The active suspension 300 is any suspension that may be mounted on each wheel of the vehicle to enable adjustment of vehicle height, and may actively adjust the vehicle height in various ways, for example by using air pressure, hydraulic pressure, or electromagnetic force.

In addition, the controller 400 according to an exemplary embodiment of the present disclosure may include a non-volatile memory (not shown) configured to store an algorithm configured to control the behavior of various components of the vehicle or to store data relating to software commands for executing the algorithm, and a processor (not shown) configured to perform the operations described below using data stored in the memory when the processor executes the algorithm. Here, the memory and the processor may be implemented as separate chips. Alternatively, the memory and the processor may be implemented in the form of being integrated with each other into a single chip, and the processor may take the form of one or more processors.

First, the monitoring device 100 detects the road surface condition of the driving path of a vehicle. The monitoring device 100 may include a camera sensor configured to capture the front or rear driving path of the vehicle or a sensor capable of determining the shape of the road surface in three dimensions, such as a lidar sensor.

In addition, since it may be assumed that the vehicle moves forwards and backwards, it may be necessary for the monitoring device 100 to detect both the front and rear sides of the vehicle. When the monitoring device includes a camera sensor, the front is captured when the vehicle is moving forwards, and the rear is captured when the vehicle is moving rearwards. Then, the controller performs image analysis on the captured image and detects bumps on the road surface according to the analysis result. Because there are many examples of prior art related to image analysis, a detailed description thereof will be omitted.

Meanwhile, based on the image analysis result, the controller 400 identifies the type of bump detected on the driving path. Bumps of various shapes may exist on the driving path, and a representative example may be a speed bump. For this reason, information on the profile of each type of bump is stored in the memory 200 in advance, and specific shape data related to the bump is called from the memory based on the type of bump identified by the controller 400. Accordingly, instead of deriving the shape of the bump using an actual sensor, only the type of bump is identified with a sensor, and the specific shape of the bump is extracted through previously prepared data. Therefore, the calculation time is greatly reduced, and quick control is possible even when the vehicle speed is high or a bump suddenly appears.

Meanwhile, the memory 200 stores a plurality of data maps distinguished based on the type of bump. In addition, each of the plurality of data maps has a vehicle dynamic characteristic as an input and a tuning factor as an output.

The controller 400 derives a tuning factor from a data map of the memory 200 corresponding to a bump detected by the monitoring device 100. Then, the controller 400 derives a target vehicle height in the form of a Gaussian distribution by substituting the tuning factor. Thereafter, the controller 400 controls the active suspension to follow the derived target vehicle height.

In the present disclosure, based on the logic for calculating the target position of a sprung mass of the vehicle, the vehicle height control using a gain value of $k_{prev}$ is applied and used as follows.

$$u_{prev} = -k_{prev}(z_{s,ref} - z_s) \quad \text{[Equation 1]}$$

Herein, $u_{prev}$ is the target control force of the active suspension, $z_{s,ref}$ is the target vehicle height value, $z_s$ is the current vehicle height value, and $k_{prev}$ is the tuning factor.

In the above equation, the target control force of the suspension is derived by multiplying the difference between the target vehicle height and the current vehicle height by the gain value. Therefore, the suspension is controlled using the target control force, and thus the vehicle height may follow the target value in real time. The current vehicle height value may be calculated based on the geometric relationship between suspension components, the target vehicle height value may be derived using a Gaussian distribution, and the gain value may be derived by substituting the vehicle dynamic characteristic into the data map.

Specifically, the suspension must be controlled based on different gain values depending on whether the vehicle speed is fast or slow. Typically, a data map composed of gain values according to the vehicle speed may be provided in the memory.

Meanwhile, the controller 400 may identify the type of detected bump, call a data map related to the identified type of bump from the memory 200, and derive a tuning factor by inputting the vehicle dynamic characteristic into the called data map. The memory 200 is provided with data maps for various types of bumps.

The vehicle dynamic characteristic may include at least one of a speed, acceleration, weight, and center of gravity of the vehicle. When passing over the same bump, when the vehicle speed is high, a greater change in the vehicle height is allowed, whereas when the vehicle speed is low, the change in the vehicle height is controlled to be close to none, thereby improving the stability of the system and minimizing discomfort of passengers. Therefore, as a representative example, the tuning factor needs to be varied according to the vehicle speed, which is a vehicle dynamic characteristic.

The tuning factor may include h and σ of the Gaussian distribution equation below.

$$z_{s,ref}(x) = \frac{h}{\sigma\sqrt{2\pi}} \exp\left(-\frac{1}{2}\left(\frac{x-\mu}{\sigma}\right)^2\right) \quad \text{[Equation 2]}$$

Herein, $z_{s,ref}(x)$ is the target vehicle height value, x is the location of the vehicle, μ is the average, and h and σ are the tuning factors.

The above equation is a function related to the Gaussian distribution shown in FIG. 2. In the graph shown, there are two Gaussian distributions. The high-height distribution "B" relates to the actual bump shape, and the low-height distribution "R" relates to the target vehicle height. In other words, an actual bump has the Gaussian distribution shown. When the vehicle goes over the bump, the suspension is controlled such that the change in vehicle height is smaller than the change in the actual bump level so as to improve ride comfort. In addition, the vehicle height is raised before passing over the bump, so the degree of change in the vehicle height is smoothed out while passing over the bump.

In the Gaussian distribution, as in Equation 2 above, the height of the distribution may be adjusted by adjusting h, and the length of the distribution may be adjusted by adjusting σ. Therefore, it is possible to derive a Gaussian distribution for the vehicle height most suitable for the current situation by preparing a data map for each shape of the bump and using h and σ, which have different values depending on the vehicle speed even for the same shape of bump.

FIG. 3 is a graph of a data map related to a tuning factor of a preview vehicle height control system and a method of controlling the same according to an embodiment of the present disclosure. The graph shows the data map from which the value of h may be derived when a vehicle speed is input. The data map may be provided with both h and σ, and may be prepared in advance for each type of bump so as to be stored in the memory and used in the controller.

Meanwhile, the controller derives the target vehicle height in the form of a Gaussian distribution along a distance axis, as shown in FIG. 2. In this process, the value of μ is adjusted so that the distribution of the vehicle height is aligned with the distribution of the actual bump. In addition, the controller may convert the Gaussian distribution along the distance axis into a Gaussian distribution along a time axis. For this process, the current vehicle speed is needed, and the X-axis of the Gaussian distribution is converted into the time axis based on the relationship between speed and distance. Accordingly, the controller may control the suspension based on time, enabling more effective and accurate timing for suspension control.

In addition, the controller 400 may derive the target vehicle height value using the Gaussian distribution along the time axis, and may control the active suspension so that the current vehicle height value follows the target vehicle height value.

FIG. 4 is a chart showing a sequence of a method of controlling a preview vehicle height control system according to an embodiment of the present disclosure. The method of controlling the preview vehicle height control system of the present disclosure includes detecting, by a monitoring device, a road surface condition of a driving path of a vehicle in step S100, detecting, by a controller, a bump on the driving path of the vehicle based on information from the monitoring device and identifying the type of the bump in step S120, calling a data map corresponding to the type of the bump identified by the controller from a memory in step S200, deriving a tuning factor by inputting a vehicle dynamic characteristic into the data map called by the controller in step S200, deriving, by the controller, a target vehicle height in a form of a Gaussian distribution by substituting the tuning factor in step S300, and controlling, by the controller, an active suspension to follow the derived target vehicle height in step S500.

First, the monitoring device detects a bump present in the driving path of a vehicle in step S100. Then, the controller identifies the type of bump that matches or is most similar to the bump detected using the bump profile of the memory in step S120. After the type of bump is identified, a data map matching the bump is called from the memory in step S200. Then, the current vehicle speed is substituted into the data map so as to derive appropriate tuning factors for h and σ in step S200.

The controller substitutes the derived tuning factors of h and σ into the equation below so as to derive a Gaussian distribution for the target vehicle height in step S300.

$$z_{s,ref}(x) = \frac{h}{\sigma\sqrt{2\pi}} \exp\left(-\frac{1}{2}\left(\frac{x-\mu}{\sigma}\right)^2\right)$$

Herein, $z_{s,ref}(x)$ is the target vehicle height value, x is the location of the vehicle, μ is the average, and h and σ are the tuning factors.

In addition, because the derived Gaussian distribution is along the distance axis, the Gaussian distribution is converted to a Gaussian distribution along the time axis so as to derive $z_{s,ref}(t)$, thereby obtaining a target vehicle height profile in the time domain in steps S320 and S340.

Meanwhile, to control a suspension, the current vehicle speed is substituted into the data map so as to obtain an appropriate gain value of $k_{prev}$ in step S210. Accordingly, an equation for deriving the target control force of the suspension is completed as follows in step S400.

$$u_{prev} = -k_{prev}(z_{s,ref} - z_s)$$

Herein, $u_{prev}$ is the target control force of the active suspension, $z_{s,ref}$ is the target vehicle height value, $z_s$ is the current vehicle height value, and $k_{prev}$ is the tuning factor.

Moreover, the controller derives the target control force of the suspension in real time according to the profile of the target vehicle height on the time axis, and controls the suspension in real time to adjust the vehicle height when passing over a bump and to realize ride comfort in step S500.

According to the preview vehicle height control system and the method of controlling the same of the present disclosure, accurate information on the bump on the road surface is obtained through a relatively small amount of calculation, the type of bump is identified, and the vehicle height is controlled to follow the Gaussian distribution according to the type of the identified bump, thereby achieving fast responsiveness and optimal ride comfort and driving stability.

As is apparent from the above description, the present disclosure provides a preview vehicle height control system and a method of controlling the same capable of obtaining accurate information on a bump on a road surface through a relatively small amount of calculation, identifying the type of bump, and controlling the vehicle height to follow a Gaussian distribution according to the type of identified bump, thereby achieving fast responsiveness and optimal ride comfort and driving stability.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A preview vehicle height control system, the system comprising:
    a monitoring device configured to detect a road surface condition of a driving path of a vehicle;
    an active suspension configured to adjust a vehicle height;
    a memory configured to store a plurality of data maps distinguished according to a type of bump, each of the data maps having a vehicle dynamic characteristic as an input and a tuning factor as an output; and
    a controller configured to derive the tuning factor based on a data map, among the plurality of data maps of the memory, corresponding to the bump detected by the monitoring device, derive a target vehicle height in a form of a Gaussian distribution by substituting the tuning factor, and control the active suspension to follow the derived target vehicle height.

2. The system according to claim 1, wherein the monitoring device includes a camera sensor configured to capture a front or rear driving path of the vehicle.

3. The system according to claim 2, wherein the controller receives a driving path image in a driving direction of the vehicle through the monitoring device, analyzes the driving path image so as to detect the bump on the driving path, and identifies the type of bump.

4. The system according to claim 1, wherein the controller identifies the type of the detected bump, calls a data map related to the identified type of bump from the plurality of data maps in the memory, and derives the tuning factor by inputting the vehicle dynamic characteristic into the called data map.

5. The system according to claim 1, wherein the vehicle dynamic characteristic includes at least one of a speed, acceleration, weight, and center of gravity of the vehicle.

6. The system according to claim 1, wherein the tuning factor comprises h and σ of the Gaussian distribution equation below:

$$z_{s,ref}(x) = \frac{h}{\sigma\sqrt{2\pi}} \exp\left(-\frac{1}{2}\left(\frac{x-\mu}{\sigma}\right)^2\right)$$

wherein $z_{s,ref}(x)$ is the target vehicle height, x is a location of the vehicle, μ is an average, and h and σ are tuning factors.

7. The system according to claim 1, wherein the tuning factor comprises $k_{prev}$ of the active suspension control force equation below:

$$u_{prev} = -k_{prev}(z_{s,ref} - z_s)$$

wherein $u_{prev}$ is a target control force of the active suspension, $z_{s,ref}$ is the target vehicle height, $z_s$ is a current vehicle height, and $k_{prev}$ is the tuning factor.

8. The system according to claim 1, wherein the controller derives the target vehicle height in the form of the Gaussian distribution along a distance axis and converts the Gaussian distribution along the distance axis into a Gaussian distribution along a time axis.

9. The system according to claim 8, wherein the controller derives the target vehicle height based on the Gaussian distribution along the time axis, and controls the active suspension so that a current vehicle height follows the target vehicle height.

10. A method of controlling a preview vehicle height control system, the method comprising:
   detecting, by a monitoring device, a road surface condition of a driving path of a vehicle;
   detecting, by a controller, a bump on the driving path of the vehicle based on information from the monitoring device and identifying a type of the bump;
   calling a data map corresponding to the type of the bump identified by the controller from a memory;
   deriving a tuning factor by inputting a vehicle dynamic characteristic into the data map called by the controller;
   deriving, by the controller, a target vehicle height in a form of a Gaussian distribution by substituting the tuning factor; and
   controlling, by the controller, an active suspension to follow the derived target vehicle height.

11. The method according to claim 10, wherein the deriving the target vehicle height in the form of the Gaussian distribution comprises substituting h and σ as tuning factors into a Gaussian distribution equation below:

$$z_{s,ref}(x) = \frac{h}{\sigma\sqrt{2\pi}} \exp\left(-\frac{1}{2}\left(\frac{x-\mu}{\sigma}\right)^2\right)$$

wherein $z_{s,ref}(x)$ is the target vehicle height, x is a location of the vehicle, μ is an average, and h and σ are tuning factors.

12. The method according to claim 10, wherein the controlling the active suspension comprises deriving a target control force of the active suspension by substituting $k_{prev}$ as the tuning factor into an active suspension control force equation below:

$$u_{prev} = -k_{prev}(z_{s,ref} - z_s)$$

wherein $u_{prev}$ is a target control force of the active suspension, $z_{s,ref}$ is the target vehicle height, $z_s$ is a current vehicle height, and $k_{prev}$ is the tuning factor.

13. The method according to claim 10, wherein the deriving the target vehicle height in the form of the Gaussian distribution comprises deriving, by the controller, the target vehicle height in a form of a Gaussian distribution along a distance axis and converting the Gaussian distribution along the distance axis into a Gaussian distribution along a time axis.

14. The method according to claim 13, wherein the deriving the target vehicle height in the form of the Gaussian distribution comprises deriving, by the controller, the target vehicle height using the Gaussian distribution along the time axis.

* * * * *